July 8, 1924.
W. C. SELBREDE
RIM TOOL
Filed Dec. 15, 1923   2 Sheets-Sheet 1
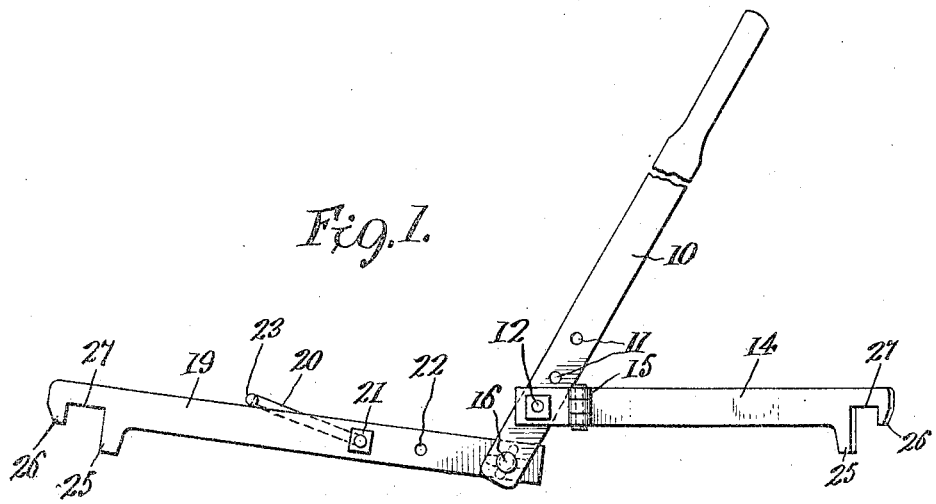
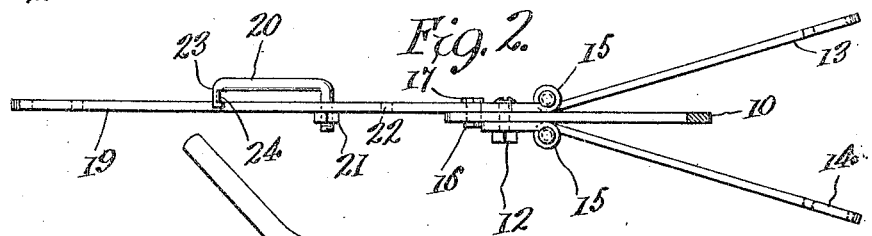
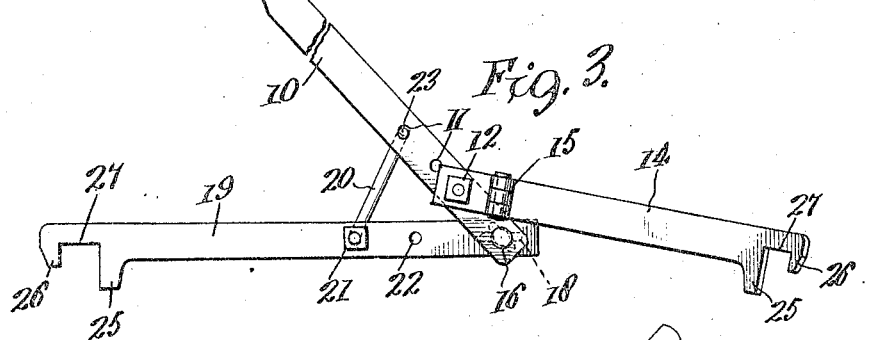
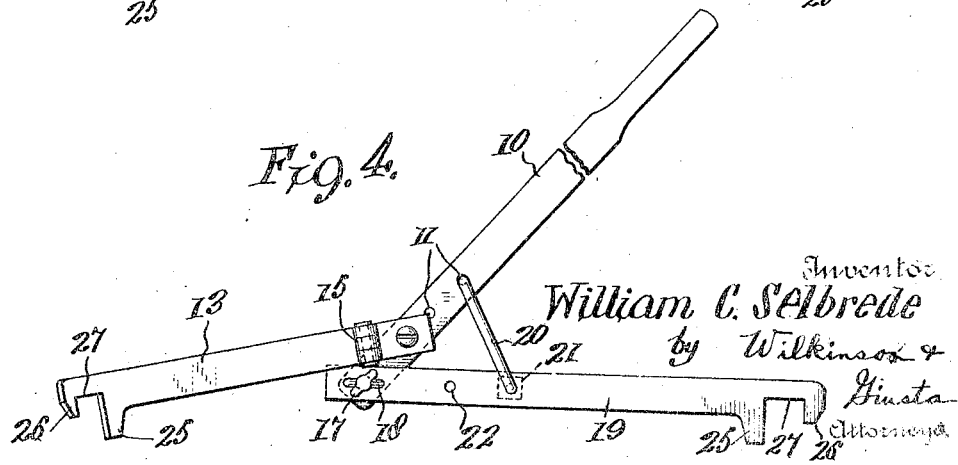
Inventor
William C. Selbrede
by Wilkinson & Giusta
Attorneys

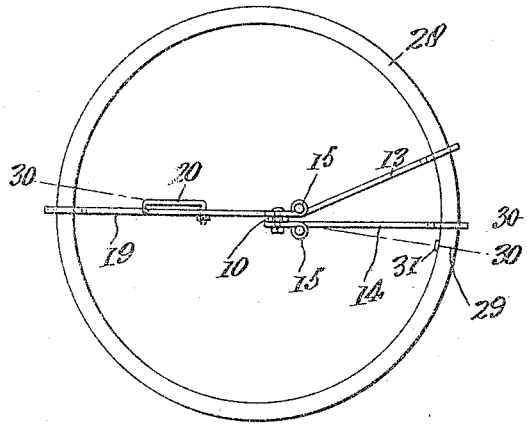
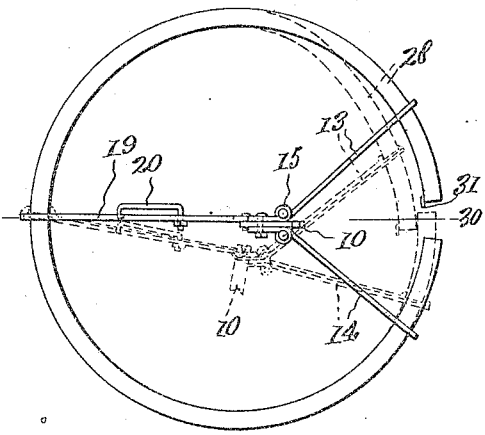
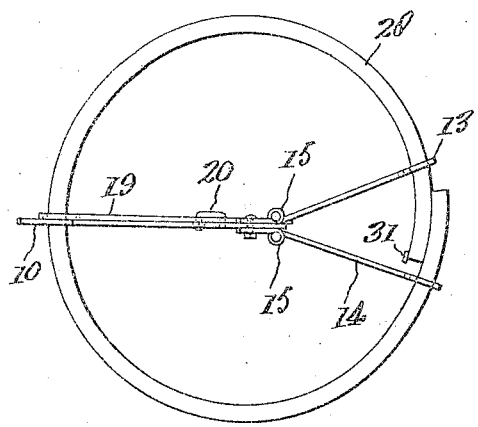
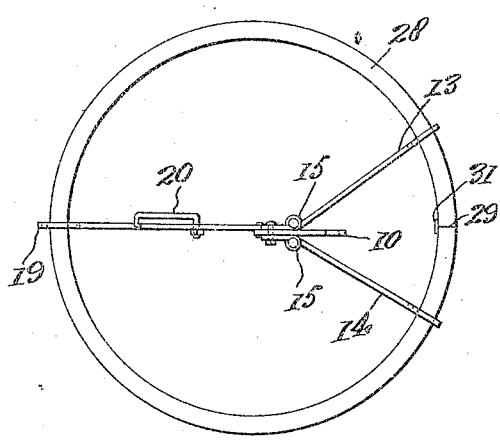

Patented July 8, 1924.

1,500,900

UNITED STATES PATENT OFFICE.

WILLIAM C. SELBREDE, OF BILLINGS, MONTANA.

RIM TOOL.

Application filed December 15, 1923. Serial No. 680,903.

*To all whom it may concern:*

Be it known that I, WILLIAM C. SELBREDE, a citizen of the United States, residing at Billings, in the county of Yellowstone and State of Montana, have invented certain new and useful Improvements in Rim Tools; and I do hereby declare the following to be a full, clear, and exact description of the invention, such as will enable others skilled in the art to which it appertains to make and use the same.

The present invention relates to a tire rim tool, and more particularly to a tool adapted to contract and expand demountable rims of the split type.

An object of the present invention is to provide a collapsible and foldable tool of this character which may be readily knocked down for convenient packing in a tool box or other small space, and which may be easily and quickly set up and applied to a rim without any additional brace or support.

A further object is to provide a tire tool of this character which may be applied to a rim for contracting the same and for holding the same in contracted position during the removal, repair and replacement of the tire and tube, and which may then be separated to expand the rim without changing the position of or removing the tool.

The invention further provides a tire rim tool of this character which has a pair of rim engaging members arranged to engage the rim at opposite sides of the split so as to prevent bending or warping of the rim out of place when the same is placed under tension in expanding and contracting the rim.

With the foregoing and other objects in view the invention will be more fully described hereinafter and will be particularly pointed out in the claim appended hereto.

In the drawings, wherein like symbols refer to like or corresponding parts throughout the several views, Fig. 1 is a side elevation of a rim tool constructed in accordance with the present invention and in partly expanded position ready for application to a rim;

Fig. 2 is a top plan view of the same, the upper end of the handle being broken away;

Fig. 3 is a side elevation of the rim tool in contracted position and showing the same latched;

Fig. 4 is a similar view taken of the reversed side of the tool;

Fig. 5 is a top plan view of the tool as applied to a rim, and showing the initial position of the tool on the rim ready to break the joint at the split;

Fig. 6 is a similar view showing the hinged claws adjusted to opposite sides of the split and showing the tool in partly expanded position, the dotted lines showing the lateral swinging of the tool for moving the ends of the split rim past one another ready for contracting the rim;

Fig. 7 is a top plan view of the tool applied to the rim for holding the same contracted; and Fig. 8 is a similar view showing the tool expanded and in position immediately subsequent to closing the rim.

Referring to the drawing, the tool, comprises a lever or handle 10 of suitable length and having at one end a handhold, and at its opposite end a series of openings 11 for selectively receiving a pivot bolt 12 which is adapted to pivotally support a pair of claws 13 and 14 arranged to swing in planes substantially parallel to the plane of the lever 10. The claws 13 and 14 are provided with hinge knuckles 15 near their inner ends, the pintles of which are disposed at right angles to the pivot bolt 12 to permit the claws 13 and 14 to be swung toward and from each other. The claws 13 and 14 are, therefore, free to pivot in different directions so as to provide, practically, a universal connection between the claws and the handle 10.

The handle 10 has upon its inner end a stud 16 which projects laterally from one side of the handle and is provided with an elongated head 17 upon its outer end, the major axis of which extends lengthwise of the handle 10 and is adapted to freely enter an elongated slot 18 which is formed in the inner end of an anchoring arm 19, which is adapted to extend from the handle 10 in a direction opposite from the claws 13 and 14. The head 17 of the stud 16 is spaced from the side of the handle 10 a distance sufficient to receive the anchoring arm 19 therebetween, so that when the arm is turned upon the stud 16 to move the slot 18 out of register with the head 17, the arm is pivotally locked to the handle 10.

The anchoring arm 19 carries a locking link 20 which in the present instance comprises a bar turned at right angles in the same direction at opposite ends and secured at one of said ends by a nut 21 through a selected one of a number of openings 22 which are formed in the arm 19, the link 20 being adapted to be swung upon the arm into various positions toward the handle 10 and being adapted to engage at its free turned end in one of the openings 11 of the handle. The free end of the link 20 has its laterally extending bill 23 undercut as at 24 to provide a seat into which the marginal edge of the opening 11 is adapted to engage for locking the link 20 from slipping out of the opening. The inner end of the link 20 is of sufficient length to permit the link to be moved laterally for engaging and disengaging the bill 23 with the handle for holding the latter in retracted position.

The outer ends of the claws 13 and 14 and of the anchoring arm 19, are provided with rim engaging portions which comprise spaced depending projections 25 and 26 with a rim edge receiving recess or cavity 27 between the projections. The projection 25 is relatively long and presents an outer flat surface adapted to engage across the inner surface of the rim while the projection 26 is relatively short and is tapered so as to engage over the edge of the rim flange and between the same and the side wall of a tire casing. The projection 26, therefore, serves to direct the rim inwardly when contracting and the projection 25 serves to force the rim outwardly when it is being expanded.

In operation, the tool is first applied to a rim 28 as shown in Fig. 5 with the anchoring arm 19 arranged to one side of the diametric plane of the split 29 of the rim as indicated by the dotted line 30—30 in Fig. 6. The claws 13 and 14 are arranged at one side of the split 29 and at the side opposite to that occupied by the anchoring arm 19. The slight movement of the handle 10 now tends to break the split and release the latch 31 or other fastening device which may be used to hold the ends of the rim together. When the ends of the rim 28 are thus separated they must be held in such positions by a suitable tool or merely by the abutting of the portions of the latch while out of registry while the claws 13 and 14 of the tool are properly adjusted for further manipulation.

After the latch 31 is released the claws 13 and 14 are spread apart so as to position one at each side of the split 29 of the rim, and the anchoring arm 19 is moved into the medial plane of the split, as indicated by the dotted line 30—30 in Fig. 6, so that equal pressure may be placed upon the opposite ends of the rim to prevent distortion or undue bending thereof. The handle 10 is now swung to one side as shown by the dotted lines in Figure 6 so as to draw the claw 13, or the claw 14 as the case may be, inwardly to move one end of the rim 28 past the other, the ends having been unlatched and separated and the handle 10 is then drawn backwardly after the initial lateral movement. This lateral movement of the handle 10 causes the claws to bend at their knuckles 15 and to also turn upon their pivot 16 to maintain the outer ends of the claws in engagement with the rim and to provide a relatively flexible connection between the handle 10 and the claws 13 and 14.

When in the position shown in Fig. 6 in dotted lines, the handle 10 may be swung backward upon the anchoring arm 19 into the position shown in Figs. 3, 4 and 7, and the lever or handle 10 may be locked by the link 20 in such retracted position. When the parts are thus retracted the ends of the rim 28 are permitted to overlap as they are drawn inwardly so that the diameter of the rim 28 is reduced and the tire or the like may be easily removed and repositioned relative to the rim.

It is apparent that this tool has a wide range of application to various sizes of rims, and that it may be made out of various kinds of materials.

As soon as the tire is placed upon the rim, the handle 10 may be again swung forwardly so as to expand the tool and force the claws 13 and 14 with their respective rim ends outwardly into the position shown in Fig. 8. When the handle 10 is released the latch 31 is then brought to initial position and may be locked and the tool removed.

It is understood that changes in form, proportion, size, and minor details may be made within the scope of the claim without departing from the spirit or sacrificing any of the advantages of the present invention.

What is claimed is:—

A tire rim tool comprising a hand lever, an anchoring arm pivoted at one end upon the lower portions of said hand lever and provided at its outer end with rim interlocking means for holding the anchoring arm from movement in either direction upon the rim, a pair of claws pivotally secured to the opposite sides of the hand lever and in spaced relation to the anchoring arm, said hand lever being adapted to be swung backwardly upon the anchoring arm for drawing said claws inwardly with respect to the anchoring arm and said claws having interlocking means upon their outer ends for engagement with the rim to hold the claws from movement in opposite directions upon the rim, said claws having knuckles adjacent their pivoted ends adapted to hinge at right angles to the pivot of the claws and said handle being adapted to be swung laterally and backwardly for contracting said claws and turning the same upon their pivots and upon said knuckles whereby the contraction and lateral swinging of the handle is adapted to move one end of the rim past the opposite end thereof and to subsequently overlap said ends and contract the rim.

WILLIAM C. SELBREDE.